(No Model.)
G. BUSCH.
REVERSING MECHANISM.
No. 597,311. Patented Jan. 11, 1898.
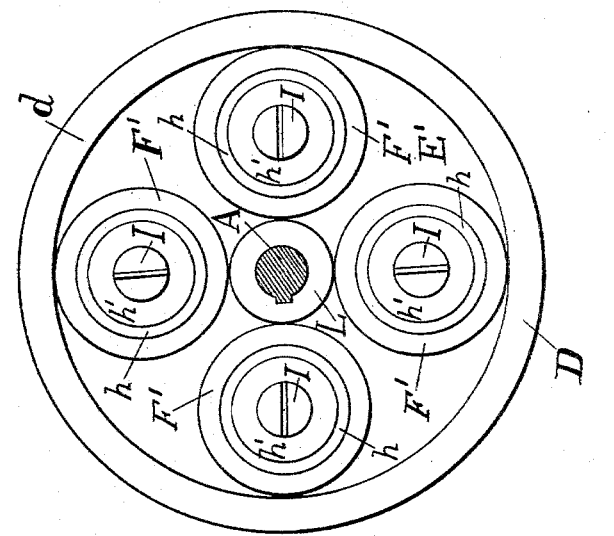
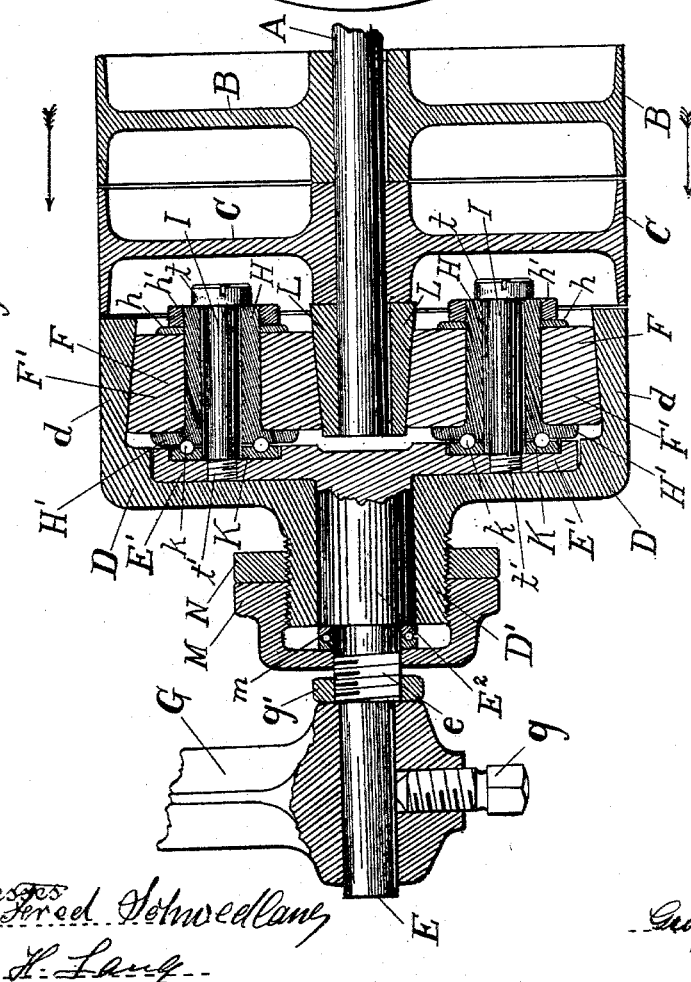
Witnesses
Fred Schwedland
H. Lang
Inventor
Geo. Busch

UNITED STATES PATENT OFFICE.

GEORGE BUSCH, OF CHICAGO, ILLINOIS, ASSIGNOR OF ONE-HALF TO HERMAN LANG, OF SAME PLACE.

REVERSING MECHANISM.

SPECIFICATION forming part of Letters Patent No. 597,311, dated January 11, 1898.

Application filed April 24, 1897. Serial No. 633,783. (No model.)

*To all whom it may concern:*

Be it known that I, GEORGE BUSCH, a citizen of the United States, residing in the city of Chicago, county of Cook, and State of Illinois, have invented a certain new and useful Improvement in Reversing Mechanism, of which the following is a specification.

My invention relates to improvements in that kind of reversing machinery in which a single belt, running continuously in the same direction, is used to drive machinery first in one direction and then in the opposite direction without changing the direction of motion of the belt; and the object of my invention is to provide mechanism for this purpose whereby simply by shifting the belt the motion of the movable part of machinery—such as planers, shapers, screw-cutting machinery, hoisting machinery, &c.—can be reversed and such movable portion made to travel in an opposite direction at an increased rate of speed. I attain this object by means of the mechanism illustrated in the accompanying drawings, in which—

Figure 1 is a side view, principally in section, of the entire device. Fig. 2 is a view of the interior gears, looking at them from the direction of the arrows, Fig. 1.

Similar letters refer to similar parts in both views.

A represents the driving-shaft of the machine to be operated, and the pulley B thereon is fastened to said shaft by a key or set-screw.

C is a loose pulley running on shaft A.

D is an overhung pulley of special construction having an offset hub D', which bears upon the enlarged portion E² of the spindle E. Said spindle E has a bearing in the hanger G, where it is held in any desired position by the set-screw $g$. This offset hub D' of the pulley D is threaded, as shown, and bears upon it the threaded cap-nut M and the nut N. Within the threaded cap-nut M, between the top of said cap and the shoulder formed by the enlarged portion E² of the spindle E, is a ball-bearing $m$, composed of two rings, as shown, encircling the spindle E, but not extending above the periphery of the enlarged portion E² of spindle E. The spindle E is also threaded at $e$, between the side of the hanger G and the enlarged portion E² of the spindle. Upon this threaded portion of the spindle is a nut $g'$.

The overhung flange $d$ of the pulley D is beveled on its inner surface to engage with the friction gear-wheels F within said pulley. These gear-wheels F consist of an outer portion F', preferably of fiber, surrounding the hub H. Said hub H has upon it, at its part next to the disk E', the upright flange H', and upon its outer portion the washer $h$, as well as the nut $h'$, which said nut is threaded to engage with a threaded portion of the hub H. Said hub H is mounted upon the stud I, which said stud has upon it the retaining-head $t$ and at its opposite extremity a screw $t'$, by which it is screwed into the disk E'. Said disk E' is mounted upon the inner end of the spindle E and may be cast integral therewith.

K is a cup set into the disk E' for a ball-bearing surrounding the inner part of the stud I. $k$ are the balls therein, which are held in place between a recess in the hub H and the cup K.

Upon the shaft A is a beveled friction gear-wheel L, engaging with the beveled friction-wheels F, formed of the fiber F' and hub H, as shown. Said gear-wheel L is keyed upon the shaft A.

The disk E' is held against rotation by the spindle E, and the pulley D rotates around said disk. This disk E' is not connected with the shaft A, there being a space between the inner end of the shaft A and said disk E'.

The operation of my device is as follows: When the belt is operating the tight pulley and it is desired to reverse the motion, the belt is shifted upon the loose pulley C, which operation checks or stops the rotation of the shaft A. The belt is then shifted onto the pulley D. This pulley is rotated in the same direction as the tight pulley B was rotated; but the interior surface of the flange $d$ engages with the interior friction gear-wheels F and causes them to rotate in the same direction as the flange $d$. The periphery of these gear-wheels engages with the beveled gear L, and thus rotates the shaft in the opposite direction from the direction of motion of the pulley D. The rate of speed with which the shaft A is thus rotated by the interior gear-wheels will be as much greater than the rate of motion at which the shaft A was rotated by the pulley B as the inside diameter of the pulley D is greater than the average diameter of the beveled gear L. Should the faces of the fiber F' wear, so as not to have proper engagement with the inside of the flange d, the inside gear-wheels may be brought into firmer contact with the inside face of the flange d by moving the spindle E and the disk E' toward the loose pulley C. This is accomplished by loosening the set-screw g and turning the nut g' toward the face of the hanger G. This motion pushes the spindle E with the disk E' and the gear-wheels F toward the loose pulley C, while the pulley D is drawn toward the hanger G by rotating the nut N and the cap M, so that they will approach the pulley D. This action pushes the threaded hub D' on the enlarged portion E² of the spindle E into the hollow space of the cap M, above the ball-bearing m, and said cap being held stationary on the spindle E by the ball-bearing m the pulley D is drawn toward the hanger G, thus preventing the flange d from being pushed too near to the loose pulley C as the spindle E is moved toward it. This adjustment being made, the set-screw g is again tightened and the parts held in their proper relations. It is obvious that this reversing motion can be accomplished with a single interior friction gear-wheel bearing upon the inside surface of the flange d and the gear L; but I prefer to insert at least four of such interior gears for the purpose of giving more positive action.

Instead of smooth surfaces on the friction gear-wheels F and the interior of the flange d there may be substituted for the interior friction-gears toothed cog-wheels engaging with teeth on the interior surface of the flange d and likewise with teeth upon the gear L. In such case, however, only one of these interior gears is required to engage with the interior surface of the flange d and the gear L, and of course no beveling in such case is required.

I am aware that a reversing motion of a shaft has been accomplished hitherto by the use of interior gearing bearing on the shaft and the interior of an outside pulley. I do not claim such broadly.

The advantages of my construction over prior constructions are that my device is simple, durable, and positive in its action, that it can be adjusted to better advantage than former constructions, and that the use of the loose pulley between the tight pulley and the pulley bearing the interior pulleys permits the forward motion of the device to cease or slack before the reversing mechanism begins to operate, thus avoiding any sudden jar. Also, by the use of this loose pulley the reversing motion may be brought to bear gradually or quickly at the will of the operator.

No friction-clutches are required, and the device is so arranged as to avoid to a great extent any dust getting upon the gears. The adjustments also are simple and yet fine.

What I claim as new, and desire to secure by Letters Patent, is—

1. The combination of a rotary shaft, a tight pulley borne upon said shaft, a separate shaft concentric with said rotary shaft, a pulley having a flange overhanging said rotary shaft, said flanged pulley being borne upon said separate shaft, and both said pulleys being adapted to be operated by one belt: interior gearing within said flange, adapted to act upon, and reverse the motion of said rotary shaft produced by said tight pulley, without changing the direction of motion of the belt, substantially as described.

2. The combination of a rotary shaft, a tight pulley and a loose pulley borne upon said rotary shaft, a separate shaft concentric with said rotary shaft, a pulley borne upon said separate shaft, and having a flange overhanging said rotary shaft; said loose pulley being located between said tight pulley and said flanged pulley: all said pulleys adapted to be operated by one belt: and interior gearing within said flange, adapted to act upon and reverse the motion of said rotary shaft produced by said tight pulley, without changing the direction of motion of the belt, substantially as described.

3. The combination of a rotary shaft, a tight pulley and a loose pulley borne upon said rotary shaft, a separate shaft concentric with said rotary shaft, a pulley borne upon said separate shaft, and having a flange with an interior bevel overhanging said rotary shaft, one or more interior friction gear-wheels, having the peripheries thereof beveled to engage the bevel on the interior of said flange; a friction gear-wheel upon said rotary shaft, beveled to engage said beveled friction gear-wheels, and means for adjusting said beveled surfaces of said interior friction-gears against said bevel on said flange, and against said friction-gear upon said rotary shaft; said loose pulley being located between said tight pulley and said flanged pulley, all substantially as described.

4. The combination of a rotary shaft, a tight pulley borne upon said rotary shaft, a non-rotary shaft concentric with said rotary shaft, a pulley having a beveled flange rotatory upon said non-rotary shaft, a plate attached to said non-rotary shaft, one or more beveled gear-wheels attached to said plate within the flanges of said flanged pulley, a beveled gear borne upon said rotary shaft, said bevels engaging with each other; a threaded offset hub on said flanged pulley, a threaded cap-nut engaging with the thread on said hub, and means for holding said cap-nut against movement along said non-rotary shaft, for the purpose of adjusting said flanged pulley back and forth upon said shaft, substantially as described.

5. The combination of a rotary shaft, a non-rotary shaft concentric therewith, a tight pulley and a loose pulley borne upon said rotary shaft, and a flanged pulley rotatory upon said non-rotary shaft, said loose pulley being located between said tight pulley and said flanged pulley: a bevel on the interior surface on the flange of said flanged pulley, a plate rigidly attached to said non-rotary shaft, and bearing one or more beveled gear-wheels to engage with the bevel on said flanged pulley, a bevel-gear on said rotary shaft to engage with said beveled gears on said plate, a threaded offset hub upon said flanged pulley, a cap-nut threaded to engage the thread on said offset hub, a shoulder on said non-rotary shaft with a suitable bearing thereon, to prevent lateral movement of said cap-nut, and a thread and nut upon said non-rotary shaft, whereby said non-rotary shaft can be adjusted laterally in its bearing, substantially as described.

GEORGE BUSCH.

Witnesses:
   JESSE COX,
   HOWARD M. COX.